United States Patent
Bowden, Jr. et al.

(10) Patent No.: US 11,263,209 B2
(45) Date of Patent: Mar. 1, 2022

(54) CONTEXT-SENSITIVE FEATURE SCORE GENERATION

(71) Applicant: Chevron U.S.A. Inc., San Ramon, CA (US)

(72) Inventors: Larry A. Bowden, Jr., Houston, TX (US); Esteban Montero, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 300 days.

(21) Appl. No.: 16/395,189

(22) Filed: Apr. 25, 2019

(65) Prior Publication Data

US 2020/0341974 A1  Oct. 29, 2020

(51) Int. Cl.
- *G06F 16/33* (2019.01)
- *G06F 16/242* (2019.01)
- *G06F 16/2457* (2019.01)
- *G06F 16/81* (2019.01)

(52) U.S. Cl.
CPC ...... *G06F 16/243* (2019.01); *G06F 16/24573* (2019.01); *G06F 16/24575* (2019.01); *G06F 16/3346* (2019.01); *G06F 16/3347* (2019.01); *G06F 16/81* (2019.01)

(58) Field of Classification Search
CPC .................................................. G06F 16/3347
See application file for complete search history.

(56) References Cited

U.S. PATENT DOCUMENTS

| | | | |
|---|---|---|---|
| 8,538,989 B1 * | 9/2013 | Datar | G06F 16/313 707/780 |
| 10,909,157 B2 * | 2/2021 | Paulus | G06N 3/0445 |
| 2004/0139059 A1 * | 7/2004 | Conroy | G06F 16/93 |
| 2005/0262050 A1 * | 11/2005 | Fagin | G06F 16/951 |
| 2007/0003147 A1 * | 1/2007 | Viola | G06F 40/211 382/229 |
| 2010/0049498 A1 * | 2/2010 | Cao | G06F 40/284 704/9 |
| 2010/0199168 A1 * | 8/2010 | Balinsky | G06F 40/103 715/234 |
| 2011/0251839 A1 * | 10/2011 | Achtermann | G06F 40/40 704/9 |
| 2012/0233127 A1 * | 9/2012 | Solmer | G06F 16/3347 707/661 |
| 2016/0070731 A1 * | 3/2016 | Chang | G06F 16/958 707/741 |
| 2017/0322939 A1 * | 11/2017 | Byron | G06N 20/00 |
| 2018/0300315 A1 * | 10/2018 | Leal | G06F 40/268 |
| 2020/0210526 A1 * | 7/2020 | Leibovitz | G06F 16/35 |
| 2020/0257761 A1 * | 8/2020 | Bull | G06F 40/279 |

\* cited by examiner

*Primary Examiner* — James Trujillo
*Assistant Examiner* — Michal Bogacki
(74) *Attorney, Agent, or Firm* — Esplin & Associates, PC

(57) ABSTRACT

Document information may define words, key groups of words, and sets of context words within a document. Word feature scores for words within the document may be generated. Key group feature scores for individual key groups of words may be generated based on aggregation of word feature scores the words within the individual key groups of words and word feature scores for words within corresponding sets of context words. A document feature score for the document may be generated based on aggregation of word feature scores for words within the document. The key group feature scores and the document feature score may enable context-sensitive searching of words/word vectors in the document.

20 Claims, 9 Drawing Sheets

Attention Mechanism Architecture

Softmax $\quad p(y_i|s_i, y_{i-1}, c_i) \propto \exp\left(y_i^\top W_o t_i\right)$ Context $\quad c_i = \sum_{j=1}^{T_x} \alpha_{ij} h_j$ Weight of h $\quad \alpha_{ij} = \dfrac{\exp(e_{ij})}{\sum_{k=1}^{T_x} \exp(e_{ik})}$ $e_{ij} = v_a^\top \tanh(W_a s_{i-1} + U_a h_j)$

CONTEXT-SENSITIVE FEATURE SCORE GENERATION

FIELD

The present disclosure relates generally to the field of generating context-sensitive feature scores for documents.

BACKGROUND

Different context of words in documents may provide different meanings to the same words in the documents. Use of key-word searching or word-vector searching to find documents that use words in a specific context may be difficult or unfeasible.

SUMMARY

This disclosure relates to generating context-sensitive feature scores for documents. Document information may be obtained. The document information may define words within a document, key groups of words within the document, and sets of context words corresponding to individual ones of the key groups of words. The sets of context words for the individual ones of the key groups of words may be determined based on a hierarchical structure of the document, locations of the key groups of words within the hierarchical structure of the document, and/or other information. Word feature scores for words within individual key groups of words, for words within individual sets of context words, and for the words within the document may be generated. Key group feature scores for the individual key groups of words may be generated based on aggregation of the word feature scores for the words within the individual key groups of words and the word feature scores for the words within the corresponding sets of context words, and/or other information. A document feature score for the document may be generated based on aggregation of the word feature scores for the words within the document, and/or other information. The key group feature scores and the document feature score may be stored. Storage of the key group feature scores and the document feature score may enable context-sensitive searching of words.

A system that generates context-sensitive feature scores for documents may include one or more electronic storage, one or more processors and/or other components. The electronic storage(s) may store document information, information relating to a document, information relating to words within the document, information relating to key groups of words within the document, information relating to sets of context words corresponding to individual ones of the key groups of words, information relating to a hierarchical structure of the document, information relating to locations of the key groups of words within the hierarchical structure of the document, information relating to word feature scores, information relating to key group feature scores, information relating to document feature scores, information relating to aggregation of feature scores, and/or other information.

The processor(s) may be configured by machine-readable instructions. Executing the machine-readable instructions may cause the processor(s) to facilitate generating context-sensitive feature scores for documents. The machine-readable instructions may include one or more computer program components. The computer program components may include one or more of a document information component, a word feature score component, an aggregation component, a storage component, and/or other computer program components.

The document information component may be configured to obtain document information and/or other information. The document information may define words within a document, key groups of words within the document, sets of context words corresponding to individual ones of the key groups of words, and/or other information within the document. The sets of context words for the individual ones of the key groups of words may be determined based on a hierarchical structure of the document, locations of the key groups of words within the hierarchical structure of the document, and/or other information.

In some implementations, the document may include requirements, and individual key groups of words within the document may correspond to individual requirements.

In some implementations, the document may further include a document title, sections, and section titles, and the sets of context words corresponding to the individual ones of the key groups of words may include words within the document title, words within a corresponding section, and words within a corresponding section title. The corresponding section and the corresponding section title for the individual ones of the key groups of words may be determined based on upper level relationships within the hierarchical structure of the document and/or other information.

In some implementations, the document may further include footnotes, and the sets of context words corresponding to the individual ones of the key groups of words may include words within a corresponding footnote. The corresponding footnote for the individual ones of the key groups of words may be determined based on lower level relationships within the hierarchical structure of the document and/or other information.

In some implementations, the document may be associated with operating system metadata, and the sets of context words corresponding to the individual ones of the key groups of words may include words within at least some of the operating system metadata.

The word feature score component may be configured to generate word feature scores for words within individual key groups of words, for words within individual sets of context words, for the words within the document, and/or for other words within the documents. The word feature scores may include one or more feature vectors.

In some implementations, the word feature scores may be generated based on processing of the document information and/or other information through one or more context-sensitive document-to-vector models. A context-sensitive document-to-vector model may include an attention distribution, a partial summary, and a vocabulary distribution. The attention distribution may facilitate generation of context-aware vector representation of words. The partial summary may facilitate validation of the attention distribution. The vocabulary distribution may facilitate combination of multiple words into a phrase.

The aggregation component may be configured to generate feature scores for one or more groups of words. In some implementations, a feature score for a group of words may be generated based on aggregation of the word feature scores for the words within the group of words, the word feature scores for words within a corresponding set of context words, and/or other information. In some implementations, the aggregation of the word feature scores may be performed based on cosine distances between individual word feature scores.

The aggregation component may be configured to generate key group feature scores for the individual key groups of words and/or other groups of words. The key group feature scores for the individual key groups of words may be based on aggregation of the word feature scores for the words within the individual key groups of words and the word feature scores for the words within the corresponding sets of context words, and/or other information. In some implementations, the aggregation of the word feature scores for the words within the individual key groups of words and the word feature scores for the words within the corresponding sets of context words may be performed based on cosine distances between individual word feature scores. The key group feature scores may include one or more arrays of feature vectors.

The aggregation component may be configured to generate a document feature score for the document. The document feature score for the document may be generated based on aggregation of the word feature scores for the words within the document and/or other information. In some implementations, the aggregation of the word feature scores for the words within the document may be performed based on cosine distances between individual word feature scores. The document feature score may include one or more arrays of feature vectors.

The storage component may be configured to store the key group feature scores, the document feature score, and/or other information within one or more electronic storages. Storage of the key group feature scores and the document feature score may enable context-sensitive searching of words.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to generating context-sensitive feature scores for documents. The methods and systems of the present disclosure may use context of words in a document to generate feature scores for key groups of words in the document. Hierarchical structure of words in the document may be used to determine relevant context of words in the document. Feature scores for key groups of words in the document may be generated based on aggregation of feature scores for individual words within the key groups, as well as feature scores for individual words that provide context for the key groups. A feature score for the document is determined based on aggregation of feature scores for individual words within the document. Such feature scores may be used to perform searches of words used in specific context.

Figure 1:
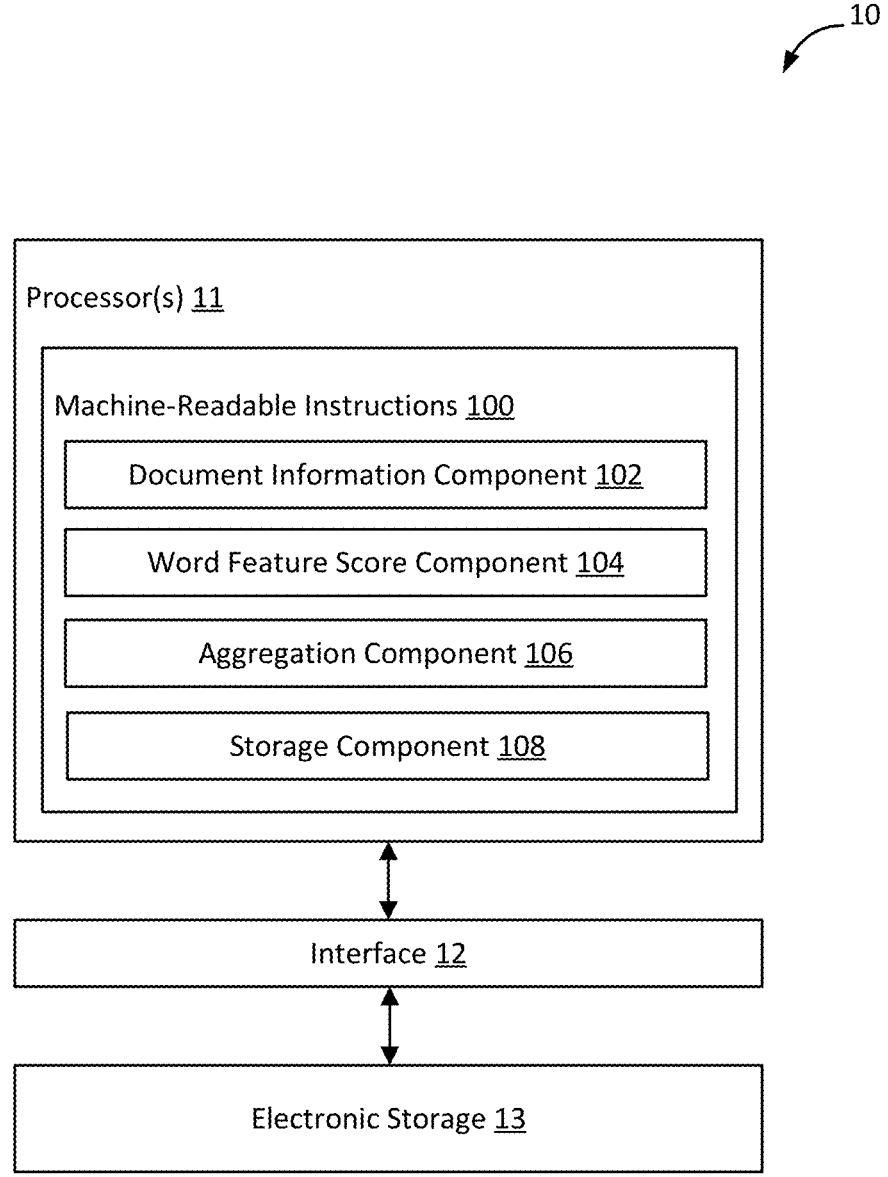
FIG. 1 illustrates an example system that generates context-sensitive feature scores for documents.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components.

Document information and/or other information may be obtained by the processor 11. The document information may define words within a document, key groups of words within the document, and sets of context words corresponding to individual ones of the key groups of words. The sets of context words for the individual ones of the key groups of words may be determined based on a hierarchical structure of the document, locations of the key groups of words within the hierarchical structure of the document, and/or other information. Word feature scores for words within individual key groups of words, for words within individual sets of context words, and for the words within the document may be generated. Key group feature scores for the individual key groups of words may be generated based on aggregation of the word feature scores for the words within the individual key groups of words and the word feature scores for the words within the corresponding sets of context words, and/or other information. A document feature score for the document may be generated based on aggregation of the word feature scores for the words within the document, and/or other information. The key group feature scores and the document feature score may be stored. Storage of the key group feature scores and the document feature score may enable context-sensitive searching of words.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store document information, information relating to a document, information relating to words within the document, information relating to key groups of words within the document, information relating to sets of context words corresponding to individual ones of the key groups of words, information relating to a hierarchical structure of the document, information relating to locations of the key groups of words within the hierarchical structure of the document, information relating to word feature scores, information relating to key group feature scores, information relating to document feature scores, information relating to aggregation of feature scores, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating context-sensitive feature scores for documents. The machine-readable instructions 100 may include one or more computer program components. The machine-readable instructions 100 may include one or more of a document information component 102, a word feature score component 104, an aggregation component 106, a storage component 108, and/or other computer program components.

The document information component 102 may be configured to obtain document information and/or other information. Obtaining document information may include one or more of accessing, acquiring, analyzing, determining, examining, identifying, loading, locating, opening, receiving, retrieving, reviewing, storing, and/or otherwise obtaining the document information. The document information component 102 may obtain document information from one or more locations. For example, the document information component 102 may obtain document information from a storage location, such as the electronic storage 13, electronic storage of a device accessible via a network, and/or other locations. The document information component 102 may obtain document information from one or more hardware components (e.g., a computing device) and/or one or more software components (e.g., software running on a computing device).

In some implementations, the document information may be obtained based on user interaction with a user interface/application, and/or other information. For example, a user interface/application may provide option(s) for a user to select one or more documents for which context-sensitive feature scores are to be generated. The document information for a document may be obtained based on the user's selection of the document through the user interface/application. In some implementations, the document information for a document may be obtained based on location in which the document is stored. For example, the document information for a document may be obtained based on storage of the document in a particular location (e.g., folder, drive, database).

A document may refer to one or more collections of information. A document may include a physical document or an electronic document. A document may be stored within one or more files. Information within a document may be stored in one or more formats and/or containers. A format may refer to one or more ways in which the information within a document is arranged/laid out (e.g., file format). A container may refer to one or more ways in which information within a document is arranged/laid out in association with other information (e.g., zip format). For example, information within a document may be stored in one or more of a text file (e.g., TXT file, DOC file, PDF file), a spreadsheet file (e.g., XLS file), a presentation file (e.g., PPT file), and/or other files.

A document may convey different information (e.g., statement, idea, data, meaning) based on arrangement of information within the document into one or more groups of information. For example, information within a text document may include characters (e.g., letters, numbers, symbols), and the text document may convey different information based on arrangement of the characters within the document into words, phrases, sentences, paragraphs, sections, and/or other groups of the characters.

The document information may characterize and/or describe content of a document. The document information may define one or more groups of information within the document. For example, document information may define words within a document, key groups of words within the document, sets of context words corresponding to individual ones of the key groups of words, and/or other information within the document.

A key group of words may refer to a group of words in the document that has more relevance/importance than other words/groups of words in the document. A key group of words may have more relevance/importance than other words/groups of words for one or more usages of the document. A usage of a document may include direct usage of the document and/or an indirect usage of the document. A usage of a document may include usage of information contained within the document, modification of information contained within the document, and/or other usage of information contained within the document. For example, a usage of a document may include indexing and/or searching of the document, and a key group of words may have more relevance/importance than other words/groups of words for indexing and/or searching of the document. Other usages of the document are contemplated.

For example, a document may include a requirements document. A requirement document may refer to a document including information relating to one or more products, one or more services, and/or other things. A requirements document may include information that defines one or more requirements for product(s), service(s), and/or other thing(s). A requirement may be defined within one or more sentences, one or more paragraphs, one or more sections, and/or other groups of words within the requirements document. A requirements document may include other information relating to product(s), service(s), and/or other thing(s). For example, a requirements document may include information defining background, definitions, explanations, footnotes, and/or other information that provide context for the requirements.

The requirements contained within a requirements document may have more relevance/importance than other words/groups of words for usage of the requirements document. For instance, when searching for one or more particular requirement(s) and/or requirements documents containing particular requirement(s), the requirements contained within the requirements documents may be more relevant to the search than other information contained within the requirements documents. Thus, for requirements documents, the requirements contained within the documents may be/form the key groups of words. Individual key groups of words within a requirements document may correspond to individual requirements within the requirements documents. Other types of documents and other types of key groups of words are contemplated.

Understanding context of words within key groups of words may be important to proper usage of the document. Context of words may refer to information that forms the setting and/or surrounding of the words. Context of words may include information that defines the setting and/or surrounding for statement, idea, and/or data conveyed by the words. Context of words may provide information from which the words may be more comprehensively and/or fully understood.

For example, different requirements documents and/or different sections of a requirements document may use the same words within different requirements. However, the context in which the words are used may result in the same words conveying different meanings and/or intents. For example, two requirements that use the same words to define requirements for equipment may convey different meanings and/or intents based on definition, specification, geography, technology, and/or commodity with respect to which the equipment is to be used.

A context word may refer to a word forming context for a key group of words. A set of context words may refer to one or more words forming context for a key group of words. Individual key groups of words may have one or more sets of context words. Same and/or different sets of context words may correspond to different key groups of words. Sets of context words corresponding to different key groups of words may or may not have overlapping words.

In some implementations, categorization of words into different types of words in a document (e.g., key groups of words, context words) may be determined based on a hierarchical structure of the document, locations of the words within the hierarchical structure of the document, and/or other information. A hierarchical structure of a document may refer to arrangement of different portions of the document into an order and/or a ranking. A hierarchical structure of document may segment different portions of the document into higher/lower order and/or higher/lower ranking. Other arrangement of different portions of the document are contemplated.

In some implementations, different levels of the hierarchical structure of document may be implemented through one or more of formatting, marking, flag, tag, special character and/or other indicator within the document and/or other indicators for the document (e.g., information contained within metadata of the document). Example levels of hierarchical structure of document may include one or more of a document title, a section title, a section body, a bullet, a sub-bullet, a footnote, and/or other levels. Other levels of hierarchical structure of document are contemplated.

Figure 3:
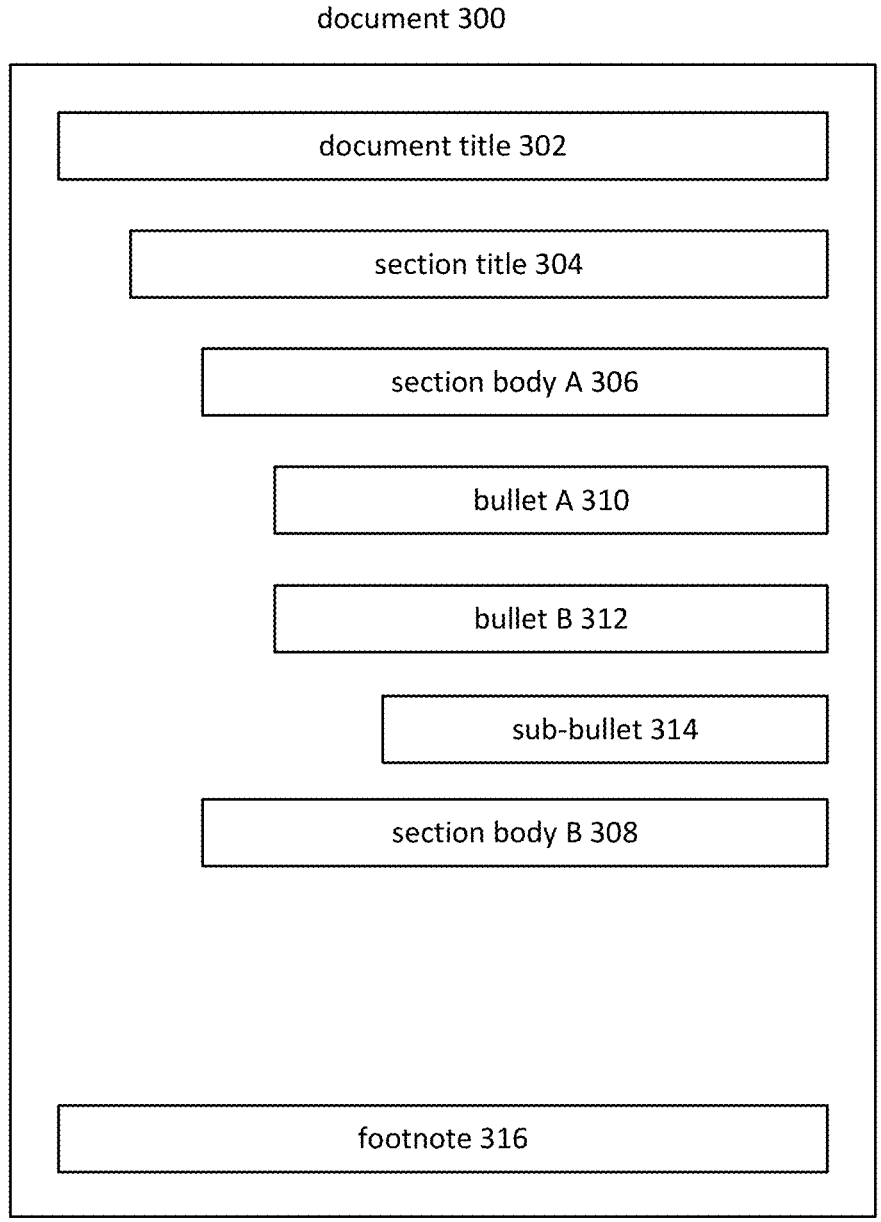
FIG. 3 illustrates example hierarchical structure of a document.

FIG. 3 illustrates an example hierarchical structure of a document 300. The top level of the hierarchical structure of the document 300 may include a document title 302. Below the document title 302 may be a section title 304. Below the section tile 304 may be a section body A 306 and a section body B 308. Below the section body A 306 may be a bullet A 310 and a bullet B 312. Below the bullet B 312 may be a sub-bullet 314. The document 300 may include a footnote 316. The footnote may be applicable to the entirety of the document 300 or a portion of the document 300. Individual levels 302, 304, 306, 308, 310, 312, 314, 316 of the document 300 may include one or more words, phrases, sentences, paragraphs, and/or other groups of words.

Categorization of words into different types of words in the document (e.g., key groups of words, context words) may be determined based on the hierarchical structure of the document, locations of the words within the hierarchical structure of the document, and/or other information. For instance, referring to FIG. 3, words located within bullet levels and sub-bullet levels of the document 300 may be categorized as key groups of words (e.g., bullet levels including requirements, sub-bullet levels including sub-requirements). The sets of context words for individual ones of such key groups of words may be determined based on the hierarchical structure of the document 300, locations of the key groups of words within the hierarchical structure of the document 300, and/or other information.

The categorization of words as being context words corresponding to different key groups of words within the document may take into account where the key groups of words are located within the document, the level of the key groups of words within the hierarchical structure of the document, and structural relationships between the key groups of words and other words in the document. The determination of the sets of context words for individual ones of the key groups of words may take into account upper-level and/or lower-level relationships between different levels within the hierarchical structure of the document.

An upper-level relationship between different levels within the hierarchical structure of the document may refer to a relationship that moves upwards (e.g., in order, in ranking) within the hierarchical structure of the document. For example, referring to FIG. 3, levels having an upper-level relationship with the bullet A 310 may include the corresponding section body A 306, the corresponding section title 304, and/or the document title 302. The set(s) of context words corresponding to the key groups of words located at the bullet A 310 may include words within the document title 302, words within the corresponding section title 304, words within the corresponding section body A 306, and/or other words within the document 300. As another example, levels having an upper-level relationship with the sub-bullet 314 may include the corresponding bullet B 312, the corresponding section body A 306, the corresponding section title 304, and/or the document title 302. The set(s) of context words corresponding to the key groups of words located at the sub-bullet 314 may include words within the corresponding bullet B 312, words within the corresponding section body A 306, words within the corresponding section title 304, words within the document title 302, and/or other words within the document 300.

A lower-level relationship between different levels within the hierarchical structure of the document may refer to a relationship that moves downwards (e.g., in order, in ranking) within the hierarchical structure of the document. In some implementations, only particular types of levels may be determined (e.g., identified, qualified) as context of a key group of words based on a lower-level relationship. For instance, footnotes may be determined as context of a key group of words based on having a lower-level relationship with the key group of words, while other levels may not be determined as context of the key group of words based on having a lower-level relationship with the key group of words.

For example, referring to FIG. 3, the footnote 316 may include a footnote of the bullet B 312. Levels having a lower-level relationship with the bullet B 312 may include the corresponding sub-bullet 314 and the corresponding footnote 316. However, the set(s) of context words corresponding to the key groups of words located at the bullet B 312 may include words within the corresponding footnote 316 and not the words within the sub-bullet 314.

In some implementations, words within a footnote may form context of all words within the document. For example, the footnote 316 may correspond to individual ones of the key groups of words located at the bullet A 310, the bullet B 312, and the sub-bullet 314. In some implementations, words within a footnote may form context of a key group of words based on a lower-level relationship between the footnote and a level of the document that has a higher-level relationship with the key group of words. For example, the footnote 316 may include a footnote of the section body A 306. The words within the footnote 316 may form context of a key group of words located at the bullet A 310, the bullet B 312, and/or the sub-bullet 314 based on (1) the footnote 316 having a lower-level relationship with the section body A 306, and (2) the section body A 306 having a higher-level relationship with the bullet A 310, the bullet B 312, and/or the sub-bullet 314.

The document may be associated with operating system metadata. Operating system metadata may refer to metadata outside the content of the document. Operating system metadata may refer to metadata that is associated with the file (defining the document) from the operating system. For example, operating system metadata may include one or more of a file name, a file date (e.g., creation date, modification date, access date), a user that last modified the file, a user that last access the file, a user that created the file (e.g., author of the file if/that is different from the author listed inside the document), and/or other information. In some implementations, the set(s) of context words corresponding to individual key groups of words may include words within at least some of the operating system metadata. Other context words are contemplated.

Context words may provide context (e.g., meaning, intent) of the information conveyed by the key groups of words. For example, a key group of words may form a requirement within a requirements documents, and the context words of the requirement may provide information on definition, specification, geography, technology, commodity, and/or other information associated with the requirement. For instance, referring to FIG. 3, the bullet A 310 may include a requirement; the words within the section body A 306, the section title 304, and/or the document title 302 may provide information on the relevant definition, specification, geography, technology, and/or commodity for the requirement. For example, the document title 302 and/or the section title 304 may include information identifying/representing relevant technology and/or commodity class. Inclusion of other information providing context for key groups of words are contemplated.

Identification of context of key groups of words using the hierarchical structure of the document may facilitate more full/comprehensive understanding of the information contained within the key groups of words than other techniques for providing context. For example, a sliding window of a certain number of words may be used to identify context of words (e.g., 10-20 words around a word being analyzed). However, such identification of context words may fail to identify relevant context words that are far from the words being analyzed. Simply increasing the size of the sliding window may not identify the relevant context words and may increase the cost of context word analysis without providing benefits. By using the hierarchical structure of the document, context words may be more accurately analyzed. Additionally, more relevant information may be identified as context words for a key group of words than when using sliding windows.

In some implementations, categorization of words into different types of words in the document (e.g., key groups of words, context words) may be performed as part of a preprocessing step. A preprocessing step may include analysis of the document to determine/generate the document information for the document. For example, preprocessing may identify key groups of words (e.g., requirements) in a document and the set(s) of context words for different key groups of words in the document. The document information for the document may be determined/generated as inputs into one or more models (e.g., neural networks) that generate feature scores for the document.

The word feature score component 104 may be configured to generate word feature scores for one or more words within the document. For example, word feature score component 104 may be configured to generate word feature scores for one or more words within individual key groups of words, for words within individual sets of context words, for the words within the document, and/or for other words associated with the document. In some implementations, generation of a word feature score for different groups of words may be shared. For example, generating word feature scores for the words within the document may generate word feature scores for words within the key groups of words and/or for words within sets of context words. As another example, generating word feature scores for the words within the key groups of words and/or for words within sets of context words may generate word feature scores for words within the document.

A word feature score may include one or more feature vectors. A feature vector may refer to a vector that contains information describing one or more characteristics of a word. A feature vector may be an n-dimensional vector of numerical features that represent the word. Different feature scores may be generated (e.g., calculated) for different words based on their different meanings. Words having similar meanings may have similar feature scores. Feature vectors of words having similar meanings may be grouped together in vector space. For example, words "cat" and "kitten" may have similar feature scores and words "dog" and "puppy" may have similar feature scores. The difference (distance) between the feature scores of words may indicate the relationships between their corresponding meanings. For example, the difference (distance) between the feature scores for "cat" and "kitten" may be similar to the difference between the feature scores for "dog" and "puppy" to indicate similar age relationships between the words. Thus, relationship between meaning of different words may be identified/determined based on their feature scores.

Figure 4:
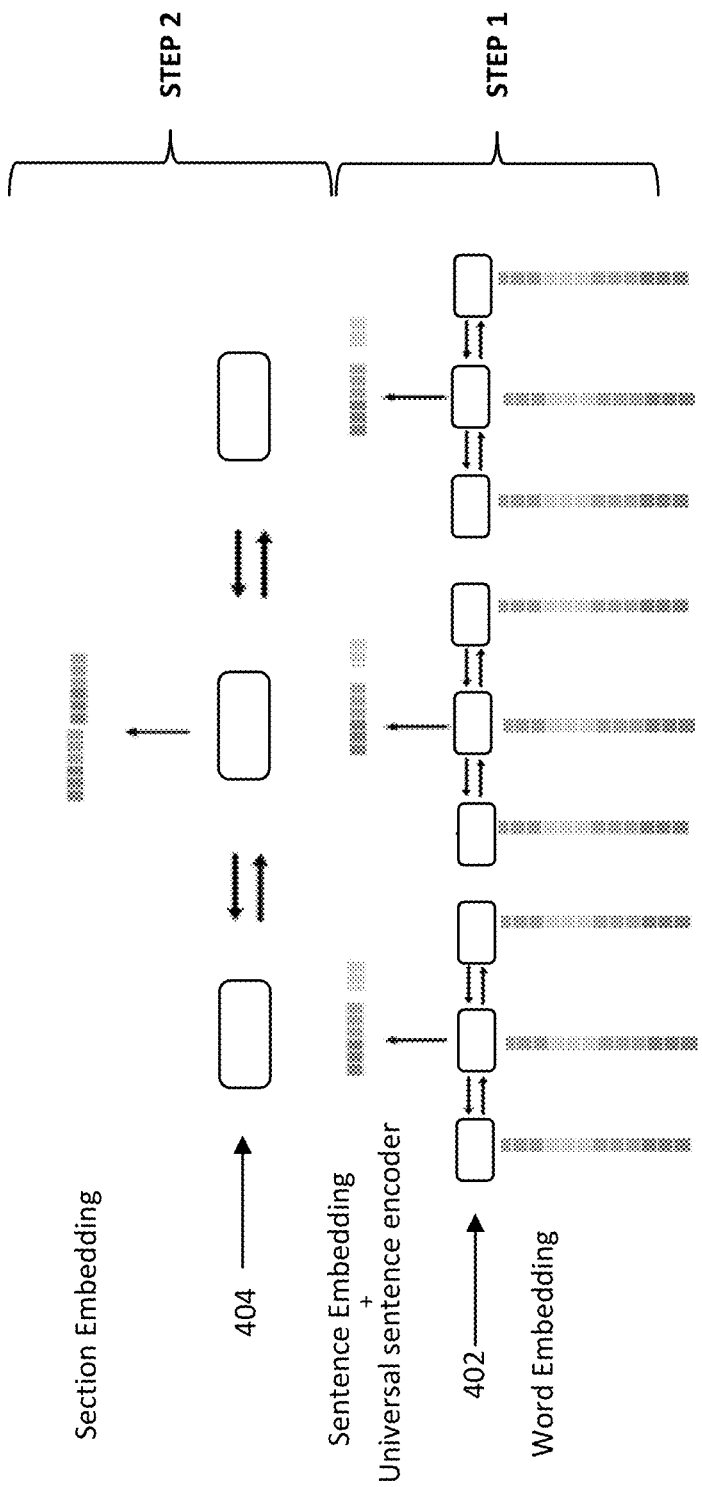
FIG. 4 illustrates an example architecture summary of a model for generating word feature scores.

In some implementations, the word feature scores may be generated based on processing of the document information and/or other information through one or more context-sensitive document-to-vector models. For example, the document information may be input into one or more context-sensitive document-to-vector models. A context-sensitive document-to-vector model may include one or more neural networks that take into account context of a word when generating a feature score for the word. FIG. 4 illustrates an example architecture summary of a context-sensitive document-to-vector model for generating word feature scores. As shown in FIG. 4, the context-sensitive document-to-vector model may include interconnected nodes 402, 404. The nodes 402, 404 may include one or more bi-directional gated recurrent units (Bi-GRU) and/or other units. The nodes 402, 404 may be used to perform word embedding and sentence embedding (Step 1), and section embedding (Step 2) for words within a document. One or more of the nodes 402, 404 may be combined using an attention mechanism to generate vector representation of words.

The context-sensitive document-to-vector model may preserve contextual information within the document. For example, the model may preserve syntactic, semantic, disclosure, equipment, and/or associated system coherence of an engineering requirement within a requirements document. The sequence and/or context of words may create a joint meaning of the engineering requirement, and the sequence of requirements may create a joint meaning of a specification provided by the requirements document.

Figure 5:
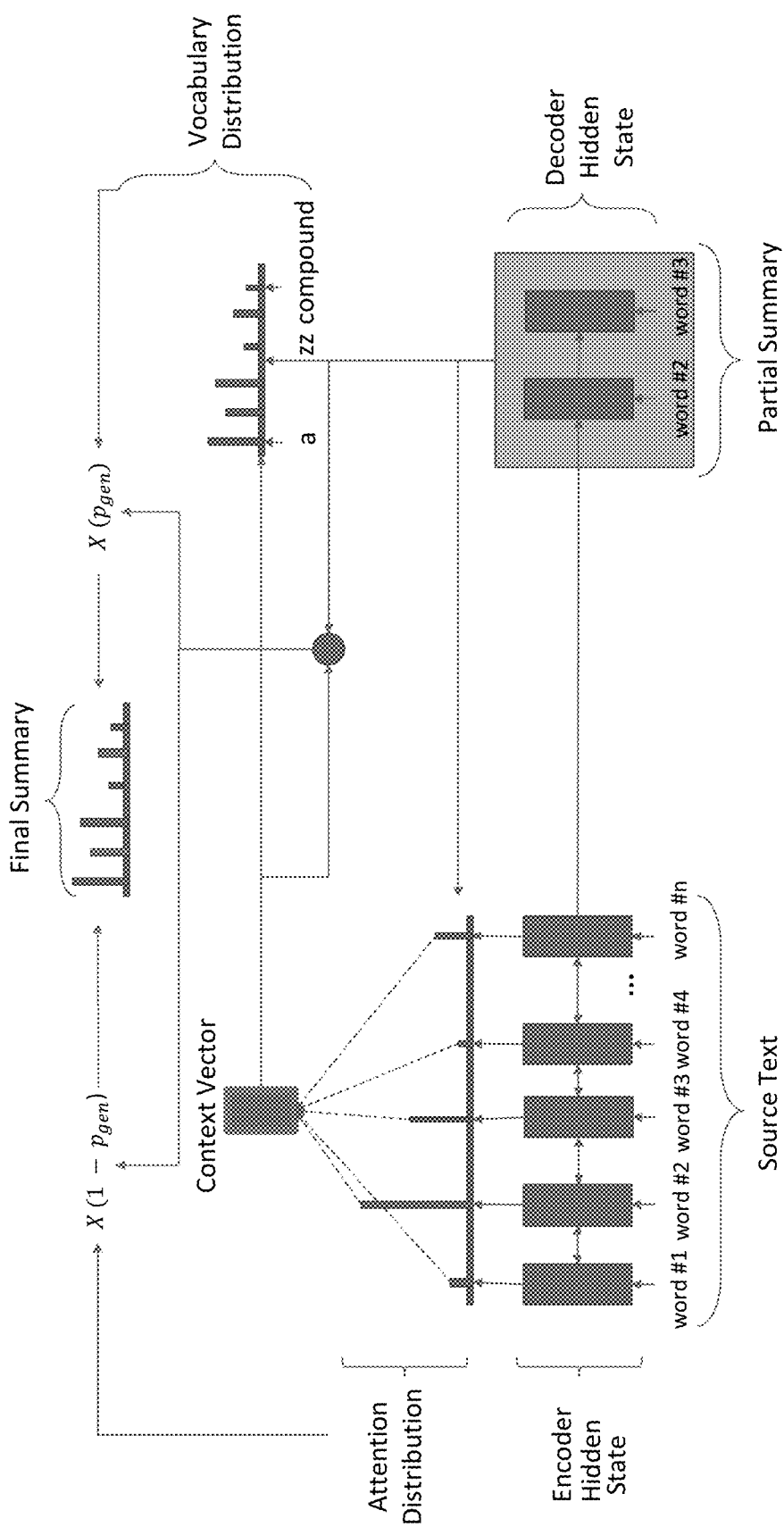
FIG. 5 illustrates an example diagram of vector computational flow within a model architecture.

FIG. 5 illustrates an example diagram of vector computational flow within a model architecture of a context-sensitive document-to-vector model. As shown in FIG. 5, an architecture of a context-sensitive document-to-vector model may include one or more of an encoder hidden state, an attention distribution, a context vector, a decoder hidden state (partial summary), a vocabulary distribution, and/or a final summary. The encoder may create vector representations of requirements (or other key groups of words) that are evaluated in two parallel processes. The first process may include the attention distribution mechanism that creates a vector to represent the context of the requirement and the second process may partially summarize or conceptualize the requirement, which is provided as an additional input into the attention distribution mechanism. An iterative process may adjust model weights and parameters until the probabilities of the separate processes are equal (context=concept). The vocabulary distribution of the partial summary (concept of the requirement) may be needed to understand meanings of singular words versus combination of words (e.g., one-word versus two-word versus three-word meanings, such as a first and last name with a middle initial or multi-word identifiers).

Figure 6A:
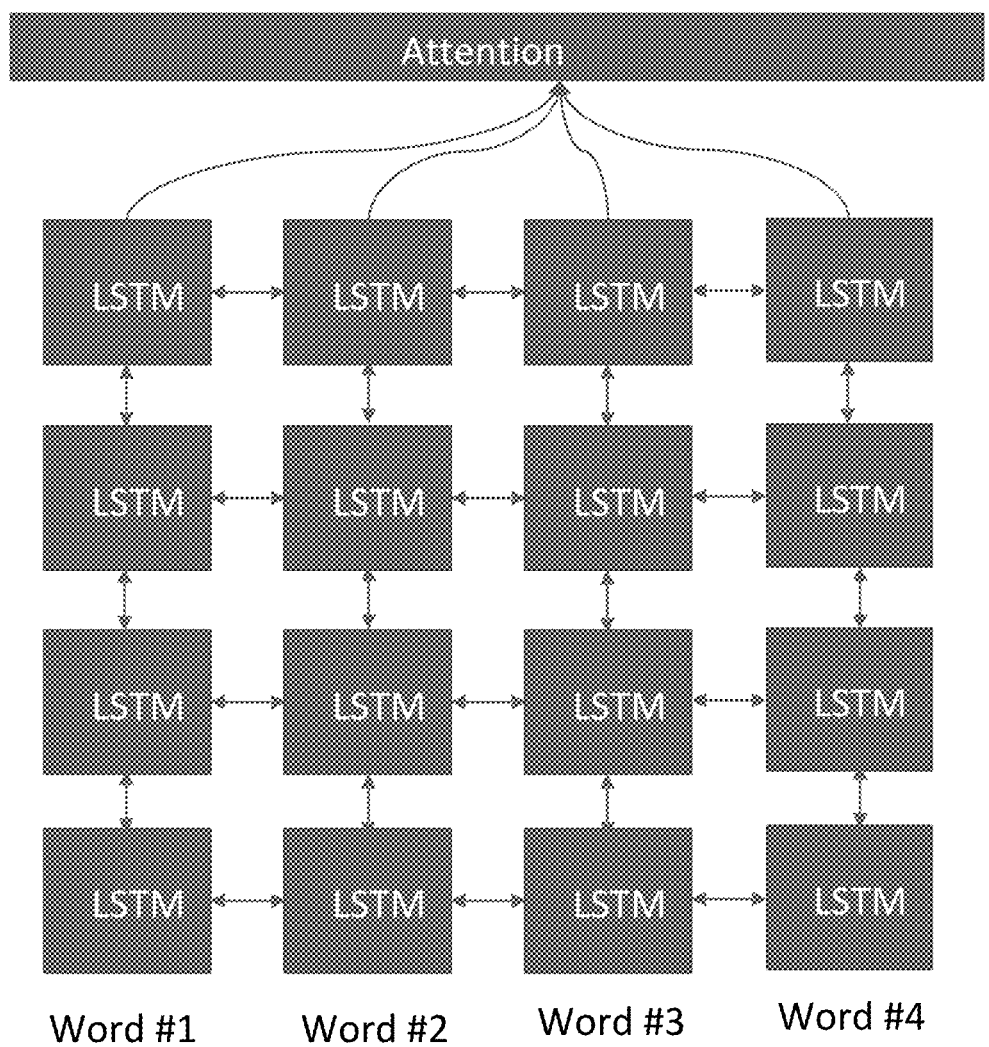
FIG. 6A illustrates an example encoder hidden state architecture.
Figure 6B:
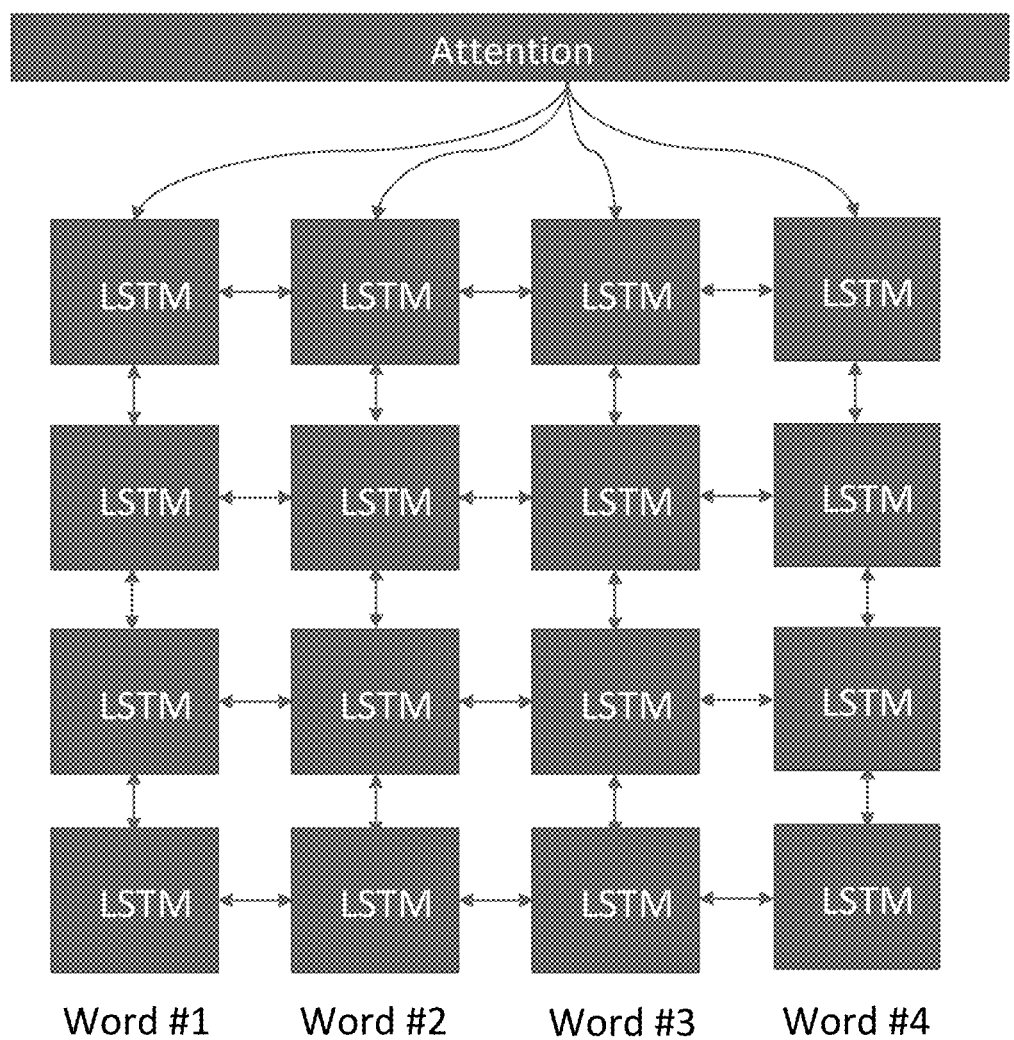
FIG. 6B illustrates an example decoder hidden state architecture.
Figure 6C:
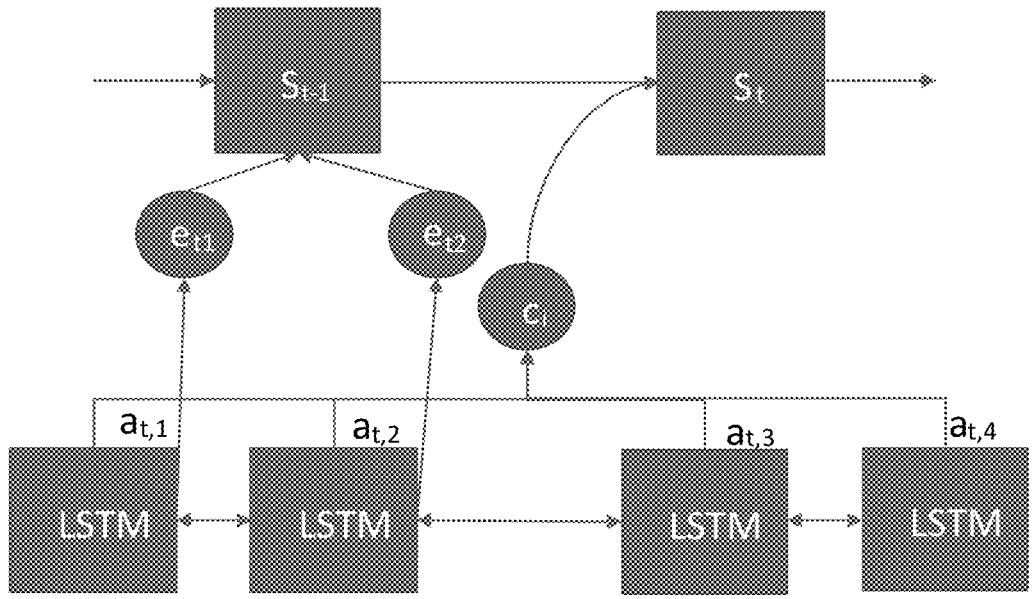
FIG. 6C illustrates an example attention mechanism architecture.

FIG. 6A illustrates an example encoder hidden state architecture. FIG. 6B illustrates an example decoder hidden state architecture. FIG. 6C illustrates an example attention mechanism architecture. As shown in FIGS. 6A, 6B, and 6C, the encoder hidden state architecture, the decoder hidden state architecture, and the attention mechanism architecture may include interconnected long short-term memory (LSTM) cells. Node weights (S, e, c, a) are shown in FIG. 6C. Nodes for context vector are represented as $c_i$. Nodes feeding the context vector for individual nodes in the decoder hidden state (partial summary or concept representation) are represented as $e_{ij}$. Weight of the S nodes (context vector) may be represented as h.

The encoder hidden state may facilitate generation of vector representations of words within source text. The attention distribution may facilitate generation of context-aware vector representation of the words. The attention distribution may be used to calculate the probability ($p_{gen}$), which may be used to determine the context-aware vector representations. The attention distribution may be used to generate the representation of context of the words. The attention distribution may assign probabilistic weights to the words based on how the words are used. For example, a word "pump" may have multiple synonyms, and the context vector may facilitate understanding that different words that refer to the same piece of equipment as the word "pump." The context vector may include a layer in the tensor flow architecture. Different vector sets may be applied based on the context of the word. That is, words may be weighted differently based on the context in which the words are used. For example, the word "pump" may refer to a piece of equipment or a verb, and the context vector may facilitate application of different weights based on the context in which the word is used (as a piece of equipment or a verb) to generate the feature scores.

The partial summary may facilitate validation of the attention distribution. The partial summary may provide a check on the weights applied by context vector. The partial summary may facilitate validation that a word is being used in a particular way (e.g., in particular context) and/or that the context that is being applied to the word is accurate. The partial summary may facilitate addressing of noisy labels.

For instance, the partial summary may enable differentiation of results from incorrect training data versus proper application of context/intent of the words. The partial summary may facilitate addressing of complex inferences. The partial summary may enable combination of knowledge graphs and facilitate determinations of states based on indirect relationships.

The vocabulary distribution may facilitate combination of multiple words into a phrase. A phrase may refer to a group of words or compound that stand together to form a unit of words. The vocabulary distribution may combine the outputs of the context vector and the partial summary and determine whether a sequence of words form a single term or separate terms. The vocabulary distribution may enable the model to account for words that in a sequence may have different meaning than the sum of individual meanings of the words in the sequence. The vocabulary distribution may enable the model to determine combination of words that form a phrase, and to determine feature scores for the combination of words (meaning of a phrase, rather than meaning of different words within the phrase).

The output of the model (e.g., generated feature score) may depend on the final summary. The final summary may include a comparison of two functions $X(1-p_{gen})$ and $X(p_{gen})$. A feature score may be generated based on the two functions converging to the same value (e.g., same vector). Convergence of the two functions may indicate that the correct/final value of the feature score has been generated. Thus, the objective function of the model may include $X(1-p_{gen})+X(p_{gen})=0$, with entropy minimization and/or absolute value minimization.

The use of the context-sensitive document-to-vector model with context words determined based on the hierarchical structure of the model may enable generation of feature scores that take comprehensive context of the words into account. Use of sliding windows to identify context words may not sufficient identify the relevant context words. For example, use of sliding windows to identify context words to generate feature scores for a requirements documents may not preserve the context of the requirements. To preserve the context of the requirements, relevant portions of the document (e.g., document title, section title, section body, footnotes) may be identified as context words, and the context-sensitive document-to-vector model may be used to generate feature scores while addressing complex inferences and noisy labels. Rather than using a fixed sliding window of words, the use of the structural hierarchy of the document enables use of a dynamic window that preserves fuller context of the requirements.

The aggregation component 106 may be configured to generate feature scores for one or more groups of words. A feature score for a group of words may be generated based on the word feature scores for the words within the group of word, the word feature scores for context words (words within one or more corresponding sets of context words), and/or other information. In some implementations, a feature score for a group of words may be generated based on aggregation of the word feature scores for the words within the group of words, the word feature scores for words within the corresponding set(s) of context words, and/or other information. In some implementations, the aggregation of the word feature scores of the different words/groups of words may be performed based on cosine distances between individual word feature scores. That is, a cosine distance formula may be used to combine the word feature scores of the relevant words.

A cosine distance formula may refer to a formula that computes a cosine distance between feature scores/feature vectors. A cosine distance between feature scores/feature vectors may refer to a measure of similarity between the feature scores/feature vectors in terms of the angle separating the feature scores/feature vectors. The cosine distance between feature scores/feature vectors may be used to determine the similarity between feature scores/feature vectors. Closer (smaller) cosine distance may indicate greater similarity between the feature scores/feature vectors, and therefore greater similarity between the meanings of the corresponding words.

The cosine distance between two feature vectors A and B may be determined based on the Euclidean dot product formula:

$$A \cdot B = \|A\| \|B\| \cos \theta$$

The cosine distance ($\cos(\theta)$) may be represented using a dot product and magnitude as the following, with $A_i$ and $B_i$ representing components of A and B, respectively:

$$\cos(\theta) = \frac{A \cdot B}{\|A\| \|B\|} = \frac{\sum_{i=1}^{n} A_i B_i}{\sqrt{\sum_{i=1}^{n} A_i^2} \sqrt{\sum_{i=1}^{n} B_i^2}}$$

Aggregation of word feature scores based on the cosine distance formula may include iterative calculation feature vectors for combinations of words, with individual calculation of feature vector including calculation of cosine distances between individual components of the feature vectors of the words.

Figure 7:
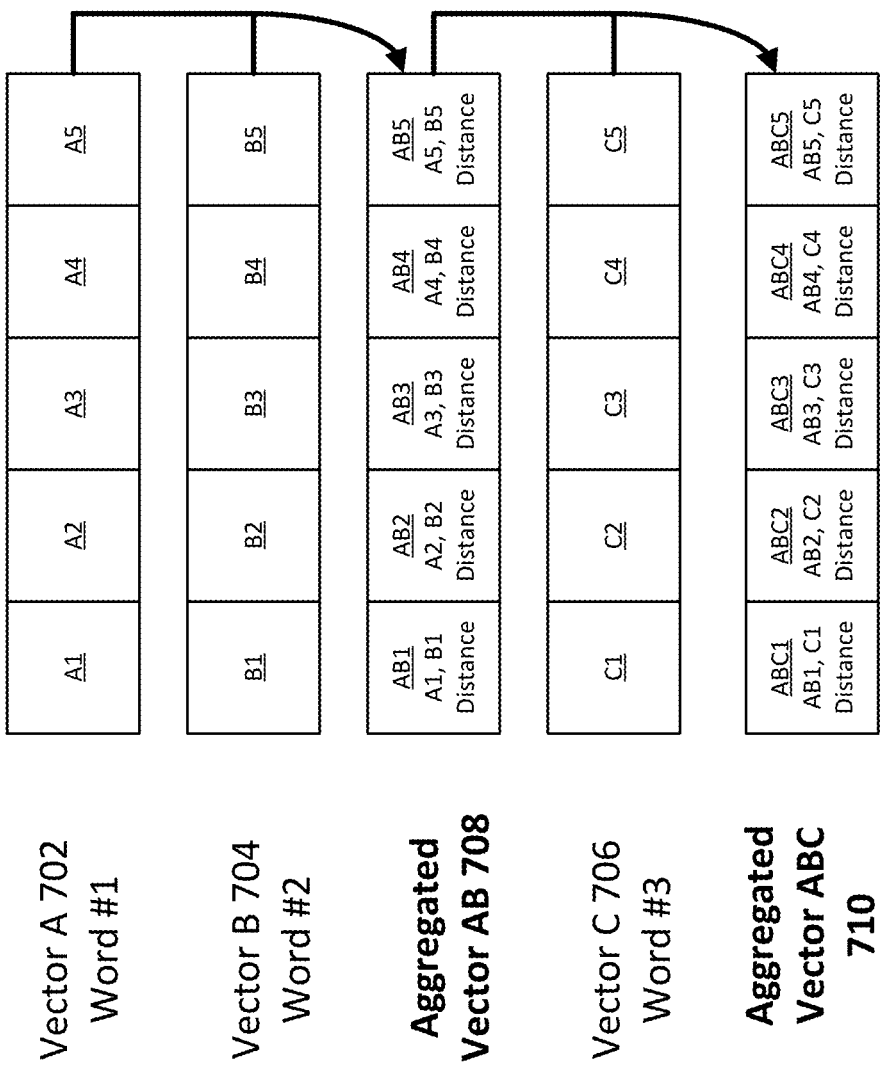
FIG. 7 illustrates an example aggregation of feature vectors.

For example, FIG. 7 illustrates an example aggregation of feature vectors 702, 704, 706 for three words (word #1, word #2, word #3). The vector A 702 may be a five-dimensional vector of numerical features that represents the word #1. The vector B 704 may be a five-dimensional vector of numerical features that represents the word #2. The vector C 706 may be a five-dimensional vector of numerical features that represents the word #3. Other dimensions of vectors and other number of words for aggregation are contemplated.

Aggregation of the feature vectors 702, 704, 706 may include aggregation of the vector A 702 and the vector B 704 to generate an aggregated vector AB 708. The aggregated vector AB 708 may include numerical features that represent the cosine distances between the numerical features of the vector A 702 and the vector B 704. The aggregated vector AB 708 and the vector C 706 may then be aggregated to generate an aggregated vector ABC 710. The aggregated vector ABC 710 may include numerical features that represent the cosine distances between the numerical features of the aggregated vector AB 708 and the vector C 706. The aggregated vector ABC 710 may form and/or be used to determine the feature score for the combination of three words. The aggregated vector ABC 710 may represent the concept of the three-words combination.

The aggregation of the feature vectors may not be dependent on the ordering in which the feature vectors are aggregated. For example, referring to FIG. 7, the aggregated vector ABC 710 may be generated based on (1) aggregation of the vector A 702 and the vector C 706 to generate an aggregated vector AC; and (2) aggregation of the aggregated vector AC and the vector B 708 to generate the aggregated vector ABC 710.

The aggregation component 106 may be configured to generate key group feature scores for individual key groups of words and/or other groups of words. The key group feature scores for the individual key groups of words may be generated based on aggregation of the word feature scores for the words within the individual key groups of words and the word feature scores for the words within the corresponding sets of context words, and/or other information. The aggregation of the word feature scores for the words within the individual key groups of words and the word feature scores for the words within the corresponding sets of context words may be performed based on cosine distances between individual word feature scores. Thus, the aggregation component 106 may combine the feature scores (e.g., feature vectors) of the words (e.g., words within the key group of words and corresponding context words) to generate the key group feature scores. A key group feature score may represent the concept of the words within the key group of words.

The key group feature scores may include one or more arrays of feature vectors, and the array(s) may represent vector calculation of the key group of words (e.g., a requirement). Such generation of key group feature scores may result in key group feature scores that provide unique vector representations of the key groups of words depending on the context of the key groups of words. For example, for requirements documents, different/unique vector representations of same requirements (requirements including the same sequence of words) may be generated based on different context of the requirements. That is, even though same words may be used in different requirements, the different context in which the requirements appear may result generation of different vector representations. Different vector representations for the same requirements may be generated to represent different concepts of the requirements, with the different concepts of the requirements incorporating the different contexts of the requirements.

As another example, the aggregation component 106 may be configured to generate a document feature score for the document. The document feature score for the document may be generated based on aggregation of the word feature scores for the words within the document and/or other information. The aggregation of the word feature scores for the words within the document may be performed based on cosine distances between individual word feature scores. The document feature score may include one or more arrays of feature vectors. Thus, the aggregation component 106 may combine the feature scores (e.g., feature vectors) of the words (e.g., words within the document) to generate the document feature scores. The document feature scores may include one or more arrays of feature vectors, and the array(s) may represent vector calculation of the document (e.g., a requirements document).

The aggregation component 106 may be configured to generate a key group feature score for individual key groups of words within a document and a document feature score for the document. These feature scores may be used to uniquely identify the document and/or different key groups of words within the document.

The storage component 108 may be configured to store the key group feature scores, the document feature score, and/or other information within one or more electronic storages. For example, the storage component 108 may store the key group feature scores, the document feature score, and/or other information within the electronic storage 13, one or more electronic storages coupled to, local to, and/or remote from the system 10, and/or other electronic storages. The key group feature scores, the document feature score, and/or other information may be stored in one or more databases and/or one or more datastores. Other storage of the key group feature scores and the document feature score are contemplated.

Storage of the key group feature scores and the document feature score may enable context-sensitive searching of words. Context-sensitive searching of words may include searching based on feature scores (e.g., key group feature scores, document feature score) that take into account the comprehensive context of words. For example, rather than searching for specific words, combination of words, and/or vector representations of words/combination of words, requirements may be searched by using key group feature scores that include unique vector representations of the key groups of words depending on the context of the key groups of words. For example, a requirement in a particular context (and/or similar requirements in similar context) may be searched for within different documents based on the key group feature score corresponding to the requirement in the particular context. For instance, searching of the document may look for the same key group feature score and/or feature score near the key group feature score within the vector space. Such searching of documents and/or key groups of words may be more efficient and/or more comprehensive than word-based searching.

While implementations of the present disclosure may be described with respect to generate feature scores for words in a document, this is merely as an example and is not meant to be limiting. One or more techniques describes herein may be configured to generate feature scores for other types of information, such as numerals, characters, drawings, shapes, graphs, symbols, multimedia, and/or other types of information.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
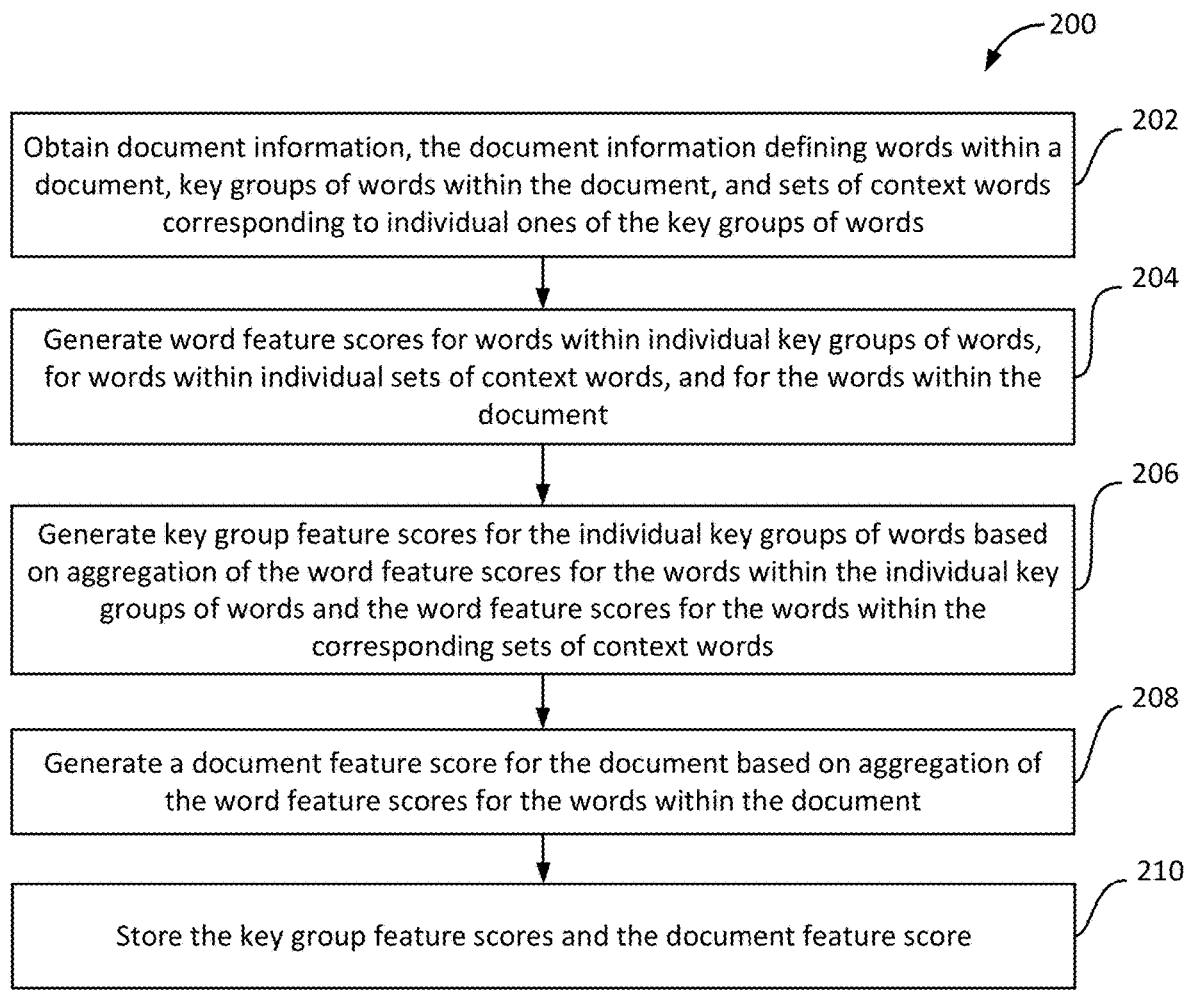
FIG. 2 illustrates an example method for generating context-sensitive feature scores for documents.

FIG. 2 illustrates method 200 for generating context-sensitive feature scores for documents. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, document information may be obtained. The document information may define words within a document, key groups of words within the document, and sets of context words corresponding to individual ones of the key groups of words. The sets of context words for the individual ones of the key groups of words may be determined based on a hierarchical structure of the document, locations of the key groups of words within the hierarchical structure of the document, and/or other information. In some implementation, operation 202 may be performed by a processor component the same as or similar to the document information component 102 (Shown in FIG. 1 and described herein).

At operation 204, word feature scores for words within individual key groups of words, for words within individual sets of context words, and for the words within the document may be generated. In some implementation, operation 204 may be performed by a processor component the same as or similar to the word feature score component 104 (Shown in FIG. 1 and described herein).

At operation 206, key group feature scores for the individual key groups of words may be generated based on aggregation of the word feature scores for the words within the individual key groups of words and the word feature scores for the words within the corresponding sets of context words, and/or other information. In some implementation, operation 206 may be performed by a processor component the same as or similar to the key group feature score component 106 (Shown in FIG. 1 and described herein).

At operation 208, a document feature score for the document may be generated based on aggregation of the word feature scores for the words within the document, and/or other information. In some implementation, operation 208 may be performed by a processor component the same as or similar to the document feature score component 108 (Shown in FIG. 1 and described herein).

At operation 210, the key group feature scores and the document feature score may be stored. Storage of the key group feature scores and the document feature score may enable context-sensitive searching of words. In some implementation, operation 210 may be performed by a processor component the same as or similar to the storage component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating context-sensitive feature scores for documents, the system comprising:
one or more physical processors configured by machine-readable instructions to:
obtain document information, the document information defining words within a document, key groups of words within the document, and sets of context words corresponding to individual ones of the key groups of words, wherein the sets of context words for the individual ones of the key groups of words are determined based on a hierarchical structure of the document and relative upper level relationships and relative lower level relationships of other words within the hierarchical structure of the document with the key groups of words;
generate word feature scores for words within individual key groups of words, for words within individual sets of context words, and for the words within the document;
generate key group feature scores for the individual key groups of words based on iterative calculation of cosine distances between the word feature scores for the words within the individual key groups of words and the word feature scores for the words within the corresponding sets of context words, the iterative calculation of the cosine distances between the word feature scores for the words within the individual key groups of words and the word feature scores for the words within the corresponding sets of context words resulting in aggregation of the cosine distances for the key group feature scores, wherein the aggregation of the cosine distances for a given key group feature score for a given key group of words represents concept of the words within the given key group of words and the words within a corresponding set of context words;
generate a document feature score for the document based on iterative calculation of cosine distances between the word feature scores for the words within the document; and
store the key group feature scores and the document feature score within one or more electronic storages, wherein storage of the key group feature scores and the document feature score enables context-sensitive searching of words that includes searching based on feature scores that take into account comprehensive context of words.

2. The system of claim 1, wherein responsive to the given key group of words and the corresponding set of context words including a first word, a second word, and a third word, the aggregation of the cosine distances for the given key group feature score for the given key group of words includes:
   calculation of an aggregated feature vector for the first word and the second word based on cosine distance calculation between a first feature vector of the first word and a second feature vector of the second word; and
   calculation of an aggregated feature vector for the first word, the second word, and the third word based on cosine distance calculation between the aggregated feature vector for the first word and the second word and a third feature vector of the third word, wherein the aggregated feature vector for the first word, the second word, and the third word represents concept of combination of the first word, the second word, and the third word.

3. The system of claim 1, wherein the document includes requirements, and individual key groups of words within the document correspond to individual requirements.

4. The system of claim 1, wherein the hierarchical structure of the document includes, in descending level order, a document title, a section title, a section body, a bullet, and a sub-bullet.

5. The system of claim 4, wherein the given key group of words includes words within the bullet, and the corresponding set of context words for the bullet is determined based on the relative upper level relationships of the other words within the hierarchical structure of the document with the bullet such that the corresponding set of context words for the bullet includes words within the section body, the section title, and the document title.

6. The system of claim 5, wherein the corresponding set of context words for the bullet is determined based on the relative lower level relationships of the other words within the hierarchical structure of the document with the bullet such that the corresponding set of context words for the bullet does not include words within the sub-bullet.

7. The system of claim 6, wherein the hierarchical structure of the document further includes a footnote, and the corresponding set of context words for the bullet is determined based on the relative lower level relationships of the other words within the hierarchical structure of the document with the bullet such that the corresponding set of context words for the bullet further includes words within the footnote.

8. The system of claim 1, wherein the document is associated with operating system metadata, and the sets of context words corresponding to the individual ones of the key groups of words include words within at least some of the operating system metadata.

9. The system of claim 1, wherein the word feature scores are generated based on processing of the document information through a context-sensitive document-to-vector model, the context-sensitive document-to-vector model including an attention distribution, a partial summary, and a vocabulary distribution.

10. The system of claim 9, wherein:
   the attention distribution facilitates generation of context-aware vector representation of words, generates a representation of context of the words, and assigns probabilistic weights to the words based on usage of the words;
   the partial summary facilitates validation of the attention distribution and provides a check on the probabilistic weights assigned to the words; and
   the vocabulary distribution facilitates combination of multiple words into a phrase by determining whether a sequence of words form a single term or separate terms.

11. A method for generating context-sensitive feature scores for documents, the method performed by a computing system including one or more processors, the method comprising:
   obtaining, by the computing system, document information, the document information defining words within a document, key groups of words within the document, and sets of context words corresponding to individual ones of the key groups of words, wherein the sets of context words for the individual ones of the key groups of words are determined based on a hierarchical structure of the document and relative upper level relationships and relative lower level relationships of other words within the hierarchical structure of the document with the key groups of words;
   generating, by the computing system, word feature scores for words within individual key groups of words, for words within individual sets of context words, and for the words within the document;
   generating, by the computing system, key group feature scores for the individual key groups of words based on iterative calculation of cosine distances between the word feature scores for the words within the individual key groups of words and the word feature scores for the words within the corresponding sets of context words, the iterative calculation of the cosine distances between the word feature scores for the words within the individual key groups of words and the word feature scores for the words within the corresponding sets of context words resulting in aggregation of the cosine distances for the key group feature scores, wherein the aggregation of the cosine distances for a given key group feature score for a given key group of words represents concept of the words within the given key group of words and the words within a corresponding set of context words;
   generating, by the computing system, a document feature score for the document based on iterative calculation of cosine distances between the word feature scores for the words within the document; and
   storing, by the computing system, the key group feature scores and the document feature score within one or more electronic storages, wherein storage of the key group feature scores and the document feature score enables context-sensitive searching of words that includes searching based on feature scores that take into account comprehensive context of words.

12. The method of claim 11, wherein responsive to the given key group of words and the corresponding set of context words including a first word, a second word, and a third word, the aggregation of the cosine distances for the given key group feature score for the given key group of words includes:
   calculation of an aggregated feature vector for the first word and the second word based on cosine distance calculation between a first feature vector of the first word and a second feature vector of the second word; and calculation of an aggregated feature vector for the first word, the second word, and the third word based on cosine distance calculation between the aggregated feature vector for the first word and the second word and a third feature vector of the third word, wherein the aggregated feature vector for the first word, the second word, and the third word represents concept of combination of the first word, the second word, and the third word.

13. The method of claim 11, wherein the document includes requirements, and individual key groups of words within the document correspond to individual requirements.

14. The method of claim 11, wherein the hierarchical structure of the document includes, in descending level order, a document title, a section title, a section body, a bullet, and a sub-bullet.

15. The method of claim 14, wherein the given key group of words includes words within the bullet, and the corresponding set of context words for the bullet is determined based on the relative upper level relationships of the other words within the hierarchical structure of the document with the bullet such that the corresponding set of context words for the bullet includes words within the section body, the section title, and the document title.

16. The method of claim 15, wherein the corresponding set of context words for the bullet is determined based on the relative lower level relationships of the other words within the hierarchical structure of the document with the bullet such that the corresponding set of context words for the bullet does not include words within the sub-bullet.

17. The method of claim 16, wherein the hierarchical structure of the document further includes a footnote, and the corresponding set of context words for the bullet is determined based on the relative lower level relationships of the other words within the hierarchical structure of the document with the bullet such that the corresponding set of context words for the bullet further includes words within the footnote.

18. The method of claim 11, wherein the document is associated with operating system metadata, and the sets of context words corresponding to the individual ones of the key groups of words include words within at least some of the operating system metadata.

19. The method of claim 11, wherein the word feature scores are generated based on processing of the document information through a context-sensitive document-to-vector model, the context-sensitive document-to-vector model including an attention distribution, a partial summary, and a vocabulary distribution.

20. The method of claim 19, wherein:

the attention distribution facilitates generation of context-aware vector representation of words, generates a representation of context of the words, and assigns probabilistic weights to the words based on usage of the words;

the partial summary facilitates validation of the attention distribution and provides a check on the probabilistic weights assigned to the words; and the vocabulary distribution facilitates combination of multiple words into a phrase by determining whether a sequence of words form a single term or separate terms.

* * * * *